United States Patent
Albers et al.

(10) Patent No.: US 10,711,628 B2
(45) Date of Patent: Jul. 14, 2020

(54) SEALING FIN HAVING AN AXIALLY ASYMMETRIC TIP PORTION

(71) Applicant: MTU Aero Engines AG, Munich (DE)

(72) Inventors: Lothar Albers, Munich (DE); Thomas Binsteiner, Munich (DE); Johann Geppert, Turkenfeld (DE); Stefan Herbst, Gerolsbach (DE); Manuel Hertter, Munich (DE); Alexander Scharf, Munich (DE); Robert Winsy, Weichs (DE); Stephen Royston Williams, Seefeld (DE)

(73) Assignee: MTU Aero Engines AG, Munich (DE)

( * ) Notice: Subject to any disclaimer, the term of this patent is extended or adjusted under 35 U.S.C. 154(b) by 256 days.

(21) Appl. No.: 15/791,972

(22) Filed: Oct. 24, 2017

(65) Prior Publication Data
US 2018/0112548 A1    Apr. 26, 2018

(30) Foreign Application Priority Data
Oct. 24, 2016 (EP) .................................... 16195268

(51) Int. Cl.
*F01D 11/00* (2006.01)
*F16J 15/447* (2006.01)
(Continued)

(52) U.S. Cl.
CPC .............. *F01D 11/001* (2013.01); *F01D 5/02* (2013.01); *F01D 9/041* (2013.01); *F01D 11/02* (2013.01);
(Continued)

(58) Field of Classification Search
CPC .......... F01D 5/02; F01D 11/001; F01D 9/041; F01D 11/02; F16J 15/447; F05D 2230/60;
(Continued)

(56) References Cited

U.S. PATENT DOCUMENTS 5,029,876 A * 7/1991 Orlando ............... F16J 15/4472
277/419
6,467,773 B1 * 10/2002 Rinaldo .................. F16J 15/004
277/409
(Continued)

FOREIGN PATENT DOCUMENTS

DE      102006050792      4/2008
DE   10 2009 055 913 A1   6/2011
(Continued)

*Primary Examiner* — Sizo B Vilakazi
(74) *Attorney, Agent, or Firm* — Davidson, Davidson & Kappel, LLC

(57) ABSTRACT

A rotor member is described for a gas turbine that is adapted for rotating about a central axis, the rotor member being a blisk having a rotor blade row that extends around the central axis or a rotor disk having a mounting portion for installing rotor blades of a rotor blade row that extends around the central axis, and being axially offset from the rotor blade row and/or the mounting portion and, extending coaxially, having at least one annular and axially asymmetrical sealing fin that has a radially outer tip portion having a front flank facing the rotor blade row and/or the mounting portion, and an opposite flank facing away from the rotor blade row and/or the mounting portion; the front flank being less steep than the opposite flank; a turbine and a compressor having such a rotor member, and a method for manufacturing such a rotor member having at least one sealing fin coating.

18 Claims, 2 Drawing Sheets

(51) Int. Cl.
 *F01D 11/02* (2006.01)
 *F01D 5/02* (2006.01)
 *F01D 9/04* (2006.01)
 *F04D 29/08* (2006.01)
 *F04D 29/32* (2006.01)
 *F04D 29/54* (2006.01)

(52) U.S. Cl.
 CPC ........... *F16J 15/447* (2013.01); *F04D 29/083* (2013.01); *F04D 29/321* (2013.01); *F04D 29/542* (2013.01); *F05D 2220/32* (2013.01); *F05D 2230/60* (2013.01); *F05D 2230/90* (2013.01)

(58) Field of Classification Search
 CPC ............. F05D 2220/32; F05D 2230/90; F04D 29/542; F04D 29/321; F04D 29/083
 See application file for complete search history.

(56) References Cited

U.S. PATENT DOCUMENTS

| | | | |
|---|---|---|---|
| 6,834,860 B2 | 12/2004 | Rinaldo et al. | |
| 7,430,802 B2* | 10/2008 | Tiemann | F01D 5/3015 29/889.22 |
| 9,182,311 B2 | 11/2015 | Clark et al. | |
| 9,309,783 B2* | 4/2016 | Nallam | F01D 11/02 |
| 2011/0070072 A1 | 3/2011 | Subramaniyan | |
| 2012/0027575 A1* | 2/2012 | Manzoori | F01D 11/02 415/174.5 |
| 2013/0149118 A1* | 6/2013 | Lotfi | F01D 11/02 415/174.5 |
| 2014/0020403 A1 | 1/2014 | Tsukuda et al. | |
| 2015/0267548 A1* | 9/2015 | Guemmer | F04D 29/602 415/209.1 |
| 2016/0047265 A1* | 2/2016 | Matsumoto | F01D 11/08 415/173.1 |
| 2016/0130965 A1* | 5/2016 | Yamaguchi | F01D 1/04 415/13 |
| 2016/0319684 A1 | 11/2016 | Scholtes | |

FOREIGN PATENT DOCUMENTS

| | | | | |
|---|---|---|---|---|
| DE | 102009055913 A1 * | 6/2011 | | F01D 11/02 |
| EP | 2302169 | 3/2011 | | |
| EP | 2677119 | 12/2013 | | |
| EP | 2687683 | 1/2014 | | |
| EP | 3056685 | 8/2016 | | |
| FR | 3013096 | 5/2015 | | |
| JP | H11197927 | 7/1999 | | |
| JP | 2015055186 | 3/2015 | | |

* cited by examiner

SEALING FIN HAVING AN AXIALLY ASYMMETRIC TIP PORTION

This claims the benefit of European Patent Application EP16195268.4, filed Oct. 24, 2016 and hereby incorporated by reference herein.

The present invention relates to a rotor member for a gas turbine, in addition to a compressor, as well as to a turbine having such a rotor member, and to a method for manufacturing a rotor member.

BACKGROUND

Compressors, in the same way as turbines in axial turbomachines, for example, aircraft engines, typically include a rotor having a plurality of rotor blade rows, that are connected to a rotor shaft, and a stator in which the rotor rotates about the central axis thereof. The stator is essentially composed of a casing and of a plurality of guide vane rows. Configured between the rotor and the stator is a flow channel through which a primary flow traverses the turbomachine. The guide vane rows are adapted for suitably directing the primary flow to the rotor blade rows. The rotor blades of the rotor blade rows can be individually manufactured and inserted into slots of a mounting portion, in particular into grooves of a rotor disk; or one-piece blisks (bladed disks) can be used which each include a disk, a ring and/or a drum portion having a plurality of rotor blades integrally formed thereon or joined (for example, welded) thereto in one piece. As compared to rotor blade rows composed of individual blades, such blisks have the particular advantage of a greater mechanical strength and a lower weight.

To prevent losses, it is necessary, in particular, that passages formed between movable and fixed components be kept as small as possible. For instance, what are generally referred to as "sealing fins" are known for sealing such passages between the rotor and the radially inner tips of the guide vanes. These are generally each formed as annular, radial projections and adapted for engaging by a tip portion into abradable coatings provided on the guide vane tips. Unless otherwise stated, the specification "radial," as well as "axial" always refer here to the intended axis of rotation of the rotor or of a rotor shaft.

To ensure that the sealing fins are able to resist the mechanical and thermal stresses that occur upon engagement into the abradable coatings, the tip and side portions thereof are generally coated. However, selective coating requires that side portions of the tip be accessible to the respective coating tool. Therefore, when working with one-piece blisks, a closely positioned rotor blade row or another, proximate sealing fin can make it impossible or, at the least, very difficult to apply a coating from an axial direction. Therefore, to simplify the radial coating of a tip portion of a blisk sealing fin, the German Patent Application DE 10 2009 055 913 A1 discusses shaping the flanks of the tip portion to be flatter than the flanks of a radially inner sealing fin portion. In general, this difficulty can arise even when working with rotor disks having a mounting portion for the rotor blades of a rotor blade row, particularly when the mounting portion ends radially outwardly relative to the sealing fins.

SUMMARY OF THE INVENTION

It is an object of the present invention to provide a technique that will be able to overcome the mentioned disadvantages and, in particular, ensure a reliable coating of sealing fins.

This objective is achieved by a rotor member, a compressor, a turbine, and by a method for manufacturing a blisk. Advantageous specific embodiments are described in the Specification, and the figures.

A rotor member according to the present invention is to be or is already installed in a gas turbine (for example, an aircraft engine), in particular in a compressor or in a turbine. It is configured as a blisk having a rotor blade row that extends around a central axis or as a rotor disk having a mounting portion for installing rotor blades to form a rotor blade row. Axially offset from the rotor blade row and/or the mounting portion, it features at least one annular sealing fin that extends coaxially to the rotor blade row and/or to the mounting portion. The central axis is thereby the intended axis of rotation of the gas turbine, respectively of the rotor thereof. The present invention provides that the at least one sealing fin have a radially outer tip portion having a front flank facing the rotor blade row and/or the mounting portion, and an opposite flank facing away therefrom, the front flank being less steep than the opposite flank.

The exact boundaries of the mentioned tip portion are not necessarily physically defined. Rather, the tip portion may be defined as a corresponding, radially outer annular portion disposed on the sealing fin and having the required properties.

The tip portion is asymmetrically configured due to the less pronounced steepness of the front flank thereof facing the rotor blade row or the mounting portion in comparison to the opposite flank thereof facing away from the rotor blade row; in comparison to a symmetrical tip portion as discussed in the German Patent Application DE 10 2009 055 913 A1, the front flank extending axially further than the opposite flank. Thus, the front flanks are able to be coated directly from above, even in the case of a radial or essentially radial spray angle. The less steep the front flank is, thus, the greater a flank angle is between the front flank and a radial plane, the better is the coating quality. The radial plane is a plane that is pierced by central axis X. The front flank has an angle within the exemplary range of between 25° and 45°. It is preferably 30°. To improve the coating of the opposite flank, it may likewise be oriented at an angle relative to the radial plane. However, due to the per se better accessibility as compared to the front flank, it suffices that the opposite flank be less steep than the front flank. A flank angle of the opposite flank is preferably within a range of from 1° to 10° to the radial plane. Preferably, it is 5°.

The front flank and the opposite flank preferably merge over a radially outer annular surface. The tip portion hereby has a planar form at the radially outer end thereof. This avoids a small degree or angle, as could arise if the front flank and the opposite flank were to merge directly. The annular surface makes the tip portion coatable and, in addition, quasi thickens it at the radially outer end thereof, thereby stabilizing it.

In an exemplary embodiment, the annular surface has at least one plane surface. The at least one plane surface extends preferably axially to the central axis and thus, technically, is readily feasible. The annular surface may also have a plurality of plane surfaces that are angled in a roof-like manner relative to one another.

In another exemplary embodiment, the annular surface features at least one arched surface. Viewed from the front flank and the opposite flank, the at least one arched surface preferably extends radially outwardly. Thus, the arched surface is curved radially outwardly, so that the tip portion is rounded. This reduces a contact area between the sealing fin and the abradable coating upon first contacting.

The tip portion preferably extends radially outwardly from a neck portion that tapers radially outwardly. Stresses that occur upon contact with the abradable coating are hereby transferred via the tip portion to a sealing fin portion that is thicker than the tip portion, thereby enhancing the resilience of the sealing fin. The term "thickness" herein refers to the maximum extent (extension) thereof in the axial direction.

To form the axial taper of the neck portion, the front flank thereof may be steeper than the tip-side front flank. A flank angle of the neck portion-side front flank is within the range of from 0° to 15° to the radial plane. It is especially preferred that it be 7°. On the one hand, the flank angle of the neck portion-side front flank is selected to allow the neck portion to stabilize the tip portion. On the other hand, the flank angle of the neck portion-side front flank is selected to ensure that, in the unexpected case that the neck portion also enters into the abradable coating, an abradable groove formed by the tip portion in the abradable coating at least not be significantly widened by the neck portion, which would promote leakage during normal operation upon exclusive engagement of the tip portion again.

Specifically, the neck portion may have a neck portion-side opposite flank that has the same steepness as the tip-side opposite flank. This makes it possible to simplify the manufacture of the tip portion and of the neck portion in the area of the opposite flanks thereof since both opposite flanks may be formed in one step. A flank angle of the neck portion-side opposite flank is preferably within the range of from 0° to 15° to the radial plane. It is especially preferred that it be 7°.

To prevent cracks from being introduced into a drum portion of the rotor member, the sealing fins have a radially inner base portion from which the neck portion extends radially outwardly, and which is thicker than the neck portion. Thus, the base portion functions as a reliable crack arrestor, so that cracks that occur unexpectedly in the sealing fin are not able to reach the drum portion, but remain in the sealing fin.

The tip portion is preferably greater in height than is the neck portion. Because the tip portion has a greater radial height than the neck portion, the coating thereof is generally simplified. Moreover, the tip portion may have a greater height than the base portion. This allows the sealing fin to be readily coated virtually over the entire height thereof.

In accordance with one especially advantageous exemplary embodiment of an inventive rotor member, the tip portion is covered with a protective coating, thereby counteracting wear thereof. The coating (in the case of an inventive rotor member or a rotor member manufactured using an inventive method) may encompass a chromium carbide coating and/or an MCrAlY coating, for example. Another coating may be a processed or unprocessed aluminum oxide-titanium oxide coating ($Al_2O_3$—$TiO_2$). The coating may be applied, for example, by thermal spraying, for instance, using the line of sight process and/or plasma spraying and, in the area of the annular surface, has a preferred thickness of 0.30 mm. The coating may be less thick in the area of the front flank and the opposite flank. In accordance with a preferred specific embodiment, the coating may extend to a radially inner neck portion of the sealing fin. In addition, the base portion of the sealing fin may be provided with the coating. The neck portion and the base portion are also hereby protected upon entering into the abradable coating. The coating may also extend on the drum portion between adjacent sealing fins.

An inventive compressor and an inventive turbine for a gas turbine each include a rotor and a stator having at least one guide vane row. The guide vanes extend radially inwardly. They are provided at the radially inner tips thereof with an abradable coating that, in particular may include honeycomb seal cells. The abradable coating may be in one piece or include a plurality of contiguous or separate components. In particular, various components of the abradable coating may be provided at different tips and be interconnected and thereby form a ring, for example. In accordance with the present invention, the rotor of the compressor or of the turbine includes at least one rotor member in accordance with one of the specific embodiments described herein whose at least one sealing fin engages at least partly into the abradable coating.

A method according to the present invention is used for manufacturing a rotor member, in particular an inventive rotor member according to one of the specific embodiments described herein. The method includes manufacturing a (one-piece) blisk having a rotor blade row extending around a central axis or manufacturing a rotor disk having slots for mounting rotor blades of a rotor blade row, in each case, having at least one annular sealing fin that is axially offset from the rotor blade row and/or the mounting portion and is configured to extend coaxially therewith. The sealing fin also features a radially outer tip portion that has a front flank facing the rotor blade row and/or the mounting portion, and an opposite flank facing away therefrom, the front flank being less steep than the opposite flank. The method also includes applying a coating to the tip portion. The application may thereby be carried out, in particular exclusively or partially radially externally. This simplifies the coating process. The blisk manufacturing may include, for example, milling, friction welding, precise electrochemical machining and/or additive manufacturing (for example, selective laser melting, electron beam melting).

Preferred exemplary embodiments of the present invention will be described in greater detail below with reference to the drawings. It is understood that individual elements and components may be combined in ways other than those described. Reference numerals for corresponding elements are used for all of the figures and, as the case may be, are not re-specified for each figure.

DETAILED DESCRIPTION

Figure 1:
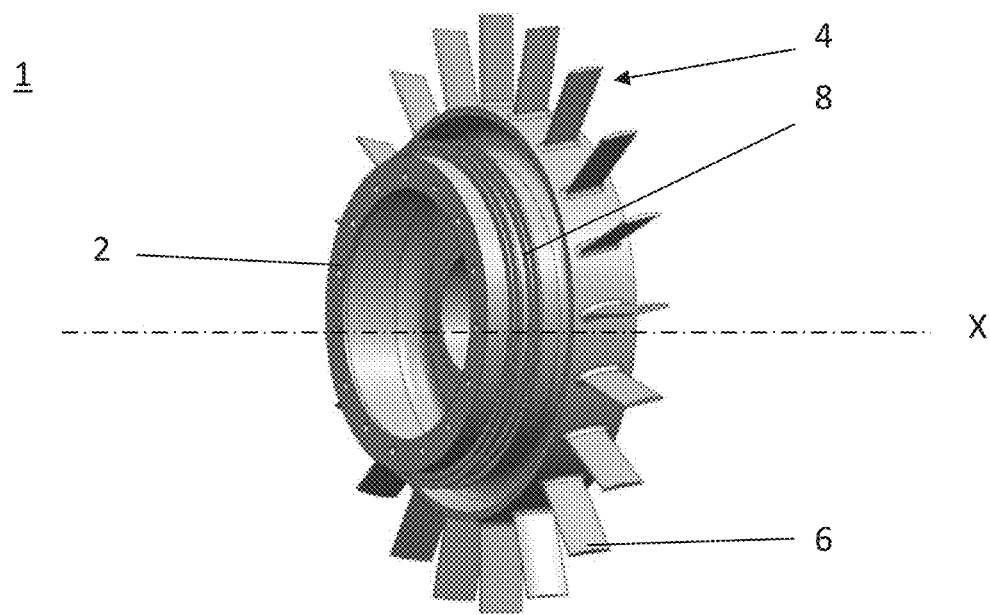
FIG. 1: shows a design of an exemplary rotor member according to the present invention in a perspective view.

FIG. 1 shows a rotor member 1 according to the present invention, exemplarily as a blisk 1 having a drum portion 2, a rotor blade row 4 having rotor blades 6, and a plurality of annular sealing fins 8. Rotor blade row 4 and sealing fins 8 extend coaxially, thus about a common central axis X that represents the axis of rotation during use of blisk 1. Sealing fins 8 are axially spaced apart (thus offset) from rotor blade row 4. Sealing fins 8 are mutually spaced apart axially and configured here exemplarily on one side of rotor blade row 4. In accordance with the representation in FIG. 1, sealing fins 8 are configured to the left or upstream of rotor blade row 4. It is self-evident that sealing fins 8 may also be configured on both sides or basically also only to the right or downstream of a rotor blade row 4. In the exemplary embodiment shown here, three sealing fins 8 are provided on each side of rotor blade row 4. For the sake of clarity, merely one sealing fin 9 of these is numbered in each case.

Figure 2:
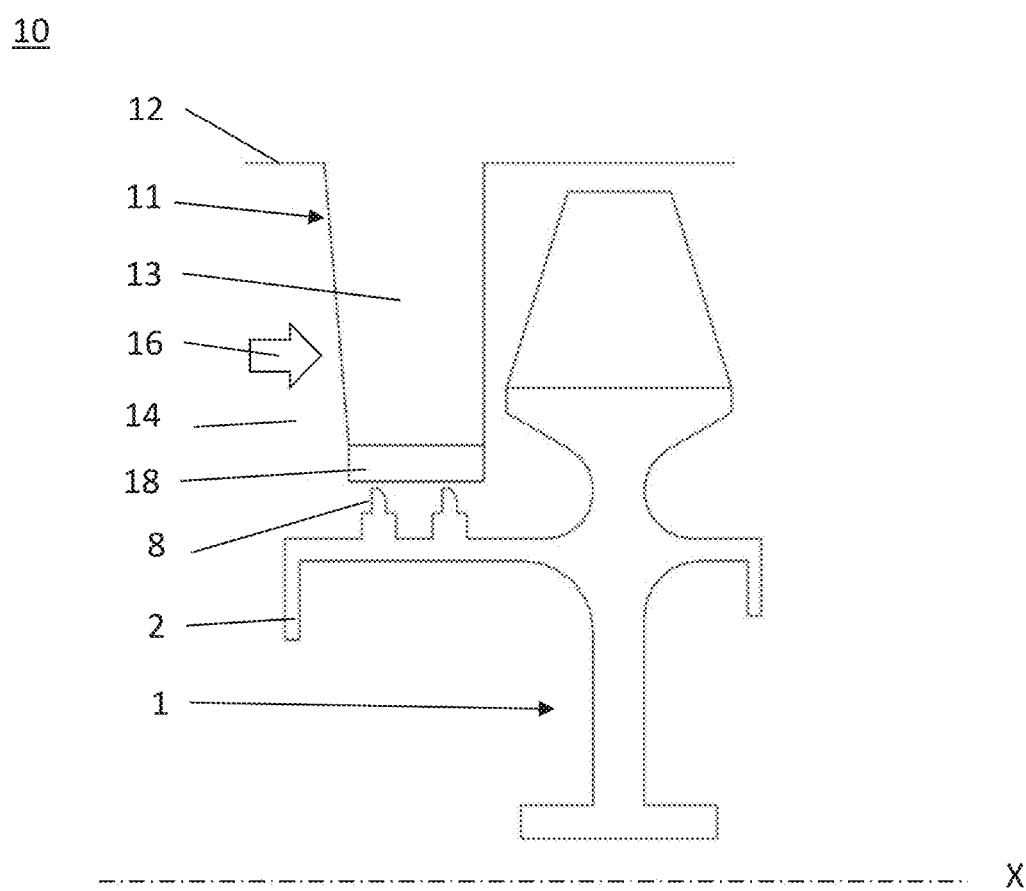
FIG. 2: shows a portion of a meridional section through an exemplary compressor according to the present invention.
Figure 3:
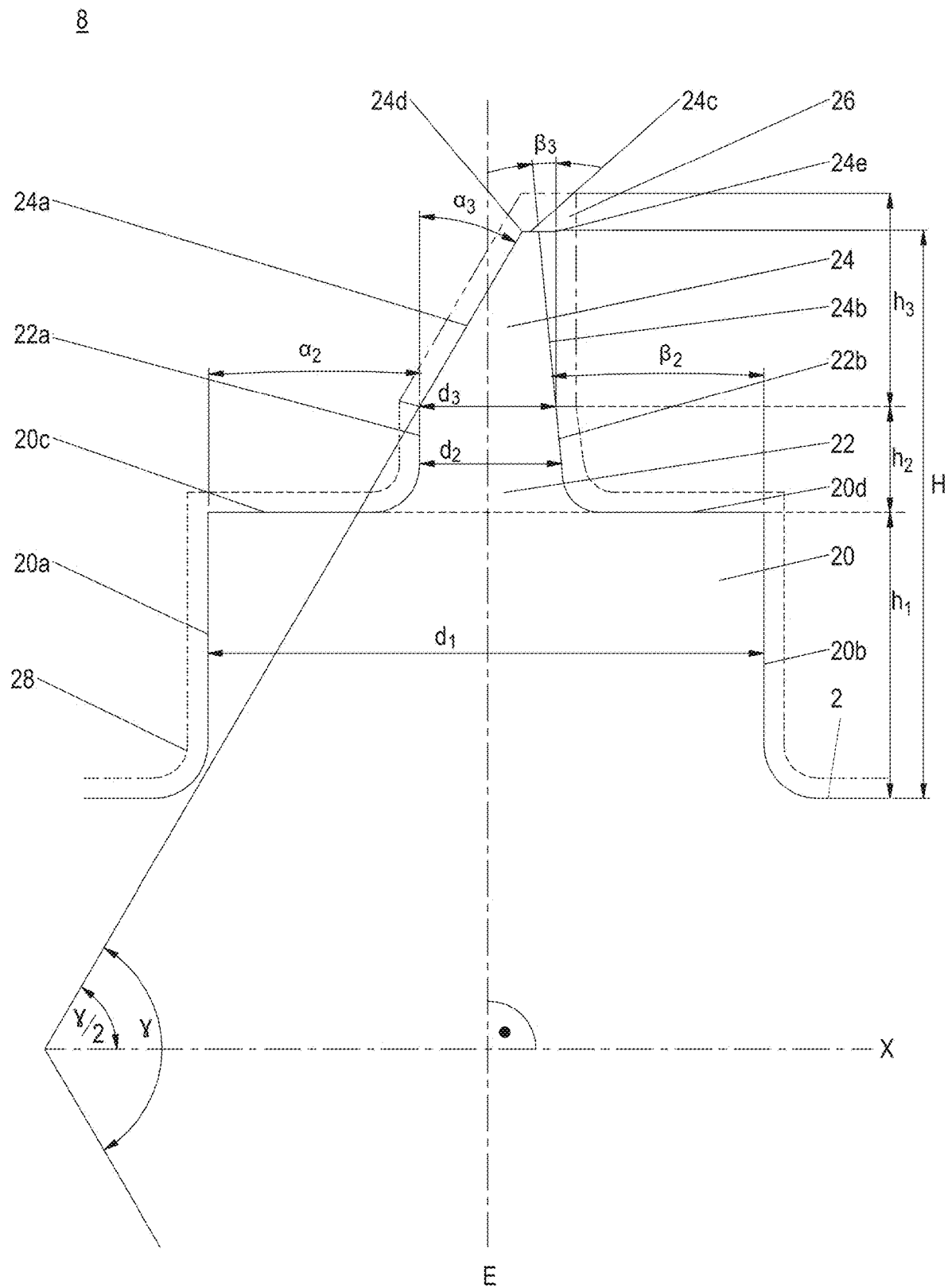
FIG. 3: shows a meridional, cross-sectional, detail view of a sealing fin according to the present invention.

FIG. 1 through 3 actually refer to a blisk as rotor member 1; however, rotor member 1 may also be a rotor disk having a mounting portion that, for example, has a plurality of receiving grooves for installing rotor blades 6 to form a rotor blade row 4.

FIG. 2 schematically shows a detail view of a meridional section of a compressor 10 according to the present invention. For the sake of clarity, not all of the recurring elements are provided with a reference numeral in FIG. 2. The detail view shows a portion of a blisk 1 along central axis X, as well as a portion of a stator 11 of compressor 10. Stator 11 features a casing 12 and, secured to casing 12, guide vane rows having guide vanes 13. Formed between a drum portion 2 of blisk 1, which, together with other components, forms a rotor, and casing 12 is an annular flow channel 14 through which a primary flow streams during normal operational use in the direction indicated by arrow 16.

Guide vanes 13 are accommodated radially outwardly in casing 12. Provided at the radially inner tips thereof are abradable coatings 18 into which sealing fins 8 engage, thereby minimizing or eliminating any leakage between abradable coatings 18 and sealing fins 8.

FIG. 3 provides a detail view of a sealing fin 8 according to a specific embodiment of the present invention, where the at least one sealing fin 8 is positioned downstream of a rotor blade row. This figure, too, shows a detail view of a meridional section along central axis X.

Illustrated sealing fin 8 has a radially inner base portion 20, a radially outer tip portion 24, and a neck portion 22 that extends therebetween.

Base portion 20 forms the radially inner annular portion of sealing fins 8. It extends radially outwardly from drum portion 2 via unnumbered fillets and has a front flank 20a facing a rotor blade row and an opposite flank 20b facing away therefrom. Front flank 20a and opposite flank 20b extend orthogonally to central axis X and thus along a radial plane E. Radial plane E is a plane that is pierced by central axis X. Sealing fin 8 is configured asymmetrically to radial plane E, in particular due to a difference in the steepness in tip portion 24 (to be described in greater detail below). Thus, there is no radial plane of symmetry through sealing fin 8. However, sealing fin 8 is axially symmetric to central axis X. Due to the orthogonal configuration of flanks 20a, 20b relative to central axis X, they extend mutually parallel in the radial direction. Base portion 20 hereby has a constant thickness $d_1$ over the radial extent or radial height $h_1$ thereof. Thickness refers herein to the maximum extent or extension thereof in the axial direction. It is self-evident that the thickness of base portion 20 may also vary; for example, it may have a trapezoidal cross section, whose thickness is greater radially inwardly than radially outwardly.

Neck portion 22 forms the radially middle annular portion of sealing fin 8. It extends approximately axially centrally from base portion 20, radially outwardly. It has a thickness $d_2$ that is smaller than thickness $d_1$ of base portion 20. Viewed in the primary flow direction, this forms a front base surface 20c and a rear base surface 20d, which preferably have the same axial extent. Base surfaces 20c, 20d extend here axially. However, they may also extend at a radially outward angle toward neck portion 22 and thus be formed as inclined surfaces. Load introduction from neck portion 22 into base portion 20 may be influenced by the angled orientation of base surfaces 20c, 20d. Neck portion 22 preferably has a radial height $h_2$ that is smaller than radial height $h_1$ of base portion 20.

Neck portion 22 has a front flank 22a facing the rotor blade row and an opposite flank 22b facing away therefrom. Neck portion 22 tapers radially outwardly. The tapering is achieved in that either front flank 22a, opposite flank 22b or both front flank 22a and opposite flank 22b is/are oriented at an angle relative to radial plane E. In the exemplary embodiment shown here, front flank 22a has a flank angle of $\alpha_2=0°$ to radial plane E. Opposite flank 22b has a flank angle $\beta_2=5°$ to radial plane E. In this exemplary embodiment, front flank 22a essentially extends along radial plane E. Alternatively, however, it may also be oriented at a flank angle of preferably $0° \leq \alpha_2 \leq 15°$.

Tip portion 24 forms the radially outer annular portion of sealing fin 8. It extends radially outwardly from neck portion 22. It has a front flank 24a facing the rotor blade row, an opposite flank 24b facing away from the rotor blade row, and an axial annular surface 24c that extends radially outwardly.

Tip portion 24 tapers radially outwardly. In the transition region from neck portion 22 to tip portion 24, both portions 22, 24 have the same thickness $d_3$, so that no neck portion surfaces are created that are comparable to base surfaces 20c, 20d. Measured from neck portion 22 to annular surface 24c, tip portion 24 has a radial height $h_3$ that is greater than radial height $h_2$ of neck portion 22 and smaller than height $h_1$ of base portion 20. When tip portion 24 is provided with a coating 26 (still to be explained in the following), height $h_3$ thereof is approximately 1.50 mm to 1.82 mm; preferably $h_3=1.66$ mm. The aforementioned absolute values are only indicated exemplarily. It is important that height $h_3$ be greater than height $h_z$ ($h_3>h_z$). Height $h_3$ may likewise be greater than height $h_1$ ($h_3>h_1$).

Front flank 24a and opposite flank 24b of tip portion 24 are oriented at an angle relative to radial plane E; relative to radial plane E, front flank 24a has a larger flank angle $\alpha_3$ and thus is less steep than opposite flank 24b. Flank angle $\alpha_3$ of front flank 24a is within an angular range of approximately 25° and 45°; preferably, flank angle $\alpha_3=30°$. In other words, front flank 24a of tip portion 22a essentially extends along a lateral surface of an abstract, thus imaginary, preferably straight circular cone about central axis X. The corresponding cone has an opening angle $\gamma$ within the range from approximately 90° to 130°; opening angle is preferably $\gamma=120°$.

In this exemplary embodiment, opposite flank 24b has a flank angle $\beta_3$ within an angular range of 1° to 10° to radial plane E; preferably, flank angle $\beta_3=5°$. Flank angle $\beta_3$ of opposite flank 24b of tip portion 24 and flank angle $\beta_2$ of opposite flank 22b of neck portion 22 are preferably selected to be the same, so that the two opposite flanks 24a, 24b merge into one another kink-free.

Annular surface 24c extends axially between front flank 24a and opposite flank 24b. It joins front flank 24a and opposite flank 24b radially outwardly. Edges 24d, 24e between front flank 24a and annular surface 24c, as well as between opposite flank 24b and annular surface 24c are rounded.

To protect tip portion 24 from damage, it is completely provided with aforementioned coating 26, as indicated by the dotted line. Thus, front flank 24a, opposite flank 24b and annular surface 24c thereof are configured underneath coating 26 and, via the same, come into frictional contact with abradable coating 18. Coating 26 follows the particular shape of front flank 24a, opposite flank 24b and annular surface 24c. It is a chromium carbide coating and/or an MCrAlY coating, for example. It may have been or be applied by thermal spraying and/or plasma spraying. For instance, in the area of annular surface 24c, it has a preferred thickness of 0.30 mm. Coating 26 may be less thick in the area of front flank 24a and opposite flank 24b. As indicated by broken line 28, coating 26 may also extend to neck portion 22, base portion 20, and to a portion of drum portion 2 between adjacent sealing fins 8, so that sealing fin 8 is completely coated over total height H thereof, and drum portions 2 are also completely coated radially outwardly between sealing fins 8.

An inventive blisk 1 for a gas turbine includes a rotor blade row 4 extending around a central axis X and, axially spaced therefrom and extending coaxially therewith, at least one annular sealing fin 8. Sealing fin 8 has a radially outer tip portion 24a having a front flank 24a facing rotor blade row 4 and an opposite flank 24b facing away therefrom, front flank 24a being less steep than opposite flank 24b. However, this is not absolutely necessary.

A turbine according to the present invention includes a rotor and a stator 11. Stator 11 includes at least one guide vane row 13 having at least one abradable coating 18. The rotor includes at least one blisk 1 according to an embodiment of the invention described herein, whose at least one sealing fin 8 at least partly engages in abradable coating 18.

Analogously, a compressor 1 according to the present invention includes a rotor and a stator 11. This includes at least one guide vane row 13 having at least one abradable coating 18. The rotor includes at least one blisk 1 according to an embodiment of the invention described herein, whose at least one sealing fin 8 at least partly engages in abradable coating 18.

A method according to the present invention for manufacturing a blisk 1 for a gas turbine includes manufacturing a blisk 1 having at least one annular sealing fin 8, as well as applying a coating 26 to at least a tip portion 24 of sealing fin 8 that has a front flank 24a facing a rotor blade row 4 and an opposite flank 24b facing away therefrom; front flank 24a being less steep than opposite flank 24b.

A rotor member is described for a gas turbine that is adapted for rotating about a central axis, the rotor member being a blisk having a rotor blade row that extends around the central axis or a rotor disk having a mounting portion for installing rotor blades of a rotor blade row that extends around the central axis, and being axially offset from the rotor blade row and/or the mounting portion and, extending coaxially, having at least one annular and axially asymmetrical sealing fin that features a radially outer tip portion having a front flank facing the rotor blade row and/or the mounting portion, and an opposite flank facing away therefrom; the front flank being less steep than the opposite flank, a turbine and a compressor having such a rotor member, and a method for manufacturing such a rotor member having at least one sealing fin coating.

LIST OF REFERENCE NUMERALS 1 rotor member
2 drum portion
4 rotor blade row
6 rotor blade
8 sealing fin
10 compressor
11 stator
12 casing
13 guide vane
14 flow channel
16 direction of a primary flow
18 abradable coating
20 base portion
20a front flank
20b opposite flank
20c front base surface
20d rear base surface
22 neck portion
22a front flank
22b opposite flank
24 tip portion
24a front flank
24b opposite flank
24c annular surface
24d edge
24e edge
26 coating
28 additional extent of the coating
$d_1$ thickness of the base portion
$d_2$ thickness of the neck portion
$d_3$ thickness of the tip portion
$h_1$ height of the base portion
$h_2$ height of the neck portion
$h_3$ height of the tip portion
$\alpha_2$ flank angle of the front flank of the neck portion
$\alpha_3$ flank angle of the front flank of the tip portion
$\beta_2$ flank angle of the opposite flank of the neck portion
$\beta_3$ flank angle of the opposite flank of the tip portion
E radial plane
H total height of a sealing fin without coating
X central axis
γ opening angle

The invention claimed is:

1. A rotor member for a gas turbine adapted for rotating about a central axis, the rotor member comprising:
   a blisk having a blisk rotor blade row extending around the central axis or a rotor disk having a mounting portion for installing rotor blades of a rotor blade row extending around the central axis; and
   at least one annular sealing fin axially offset from the blisk rotor blade row or the rotor blade row or the mounting portion and extending coaxially therewith, and having a radially outer tip portion having a front flank facing the blisk rotor blade row or the rotor blade row or the mounting portion, and an opposite flank facing away from the front flank, the front flank being less steep than the opposite flank.

2. The rotor member as recited in claim 1 wherein the front flank and the opposite flank at the tip side merge over an annular surface.

3. The rotor member as recited in claim 2 wherein the annular surface has at least one plane surface.

4. The rotor member as recited in claim 2 wherein the annular surface has at least one arched surface.

5. The rotor member as recited in claim 1 wherein the tip portion extends radially outwardly from a neck portion, the neck portion tapering radially outwardly.

6. The rotor member as recited in claim 5 wherein the neck portion has a neck front flank steeper than the front flank.

7. The rotor member as recited in claim 5 wherein the neck portion has a neck opposite flank having a same steepness as the opposite flank.

8. The rotor member as recited in claim 5 wherein the neck portion extends radially outwardly from a base portion having a greater axial thickness than the neck portion.

9. The rotor member as recited in claim 5 wherein the tip portion has a height greater than a height of the neck portion.

10. The rotor member as recited in claim 1 wherein at least the tip portion is covered with a coating.

11. A compressor for a gas turbine comprising:
a rotor; and
a stator including a guide vane row having radially inwardly extending guide vanes with guide vane tips, an abradable coating being provided on the guide vane tips;
the rotor having at least one rotor member as recited in claim 1, the annular sealing fin engaging at least partly into the abradable coating.

12. A turbine for a gas turbine, comprising:
a rotor; and
a stator including a guide vane row having radially inwardly extending guide vanes with guide vane tips, an abradable coating being provided on the guide vane tips;
the rotor having at least one rotor member as recited in claim 1, the annular sealing fin engaging at least partly into the abradable coating.

13. A method for manufacturing a rotor member for a gas turbine,
the method comprising:
manufacturing a blisk having a blisk rotor blade row extending around a blisk central axis, or manufacturing a rotor disk having a mounting portion for installing rotor blades of a rotor blade row extends around a central axis, the rotor member having at least one annular sealing fin axially offset from the blisk rotor blade row or the rotor blade row or the mounting portion and being configured to extend coaxially therewith, the rotor member having a radially outer tip portion having a front flank facing the blisk rotor blade row or the rotor blade row or the mounting portion, and an opposite flank facing away from the front flank; the front flank being less steep than the opposite flank, and
applying a coating to the tip portion.

14. The rotor member as recited in claim 1 wherein the radially outer tip portion is asymmetrical.

15. The rotor member as recited in claim 1 wherein the front flank has an angle of 25 to 45 degrees with respect to a radial plane.

16. The rotor member as recited in claim 15 wherein the opposite flank has an angle of 1 to 10 degrees with respect the radial plane.

17. The rotor member as recited in claim 15 wherein the front flank has an angle of 30 degrees with respect to a radial plane.

18. The rotor member as recited in claim 17 wherein the opposite flank has an angle of 5 degrees with respect the radial plane.

* * * * *